June 20, 1967 H. W. A. VANDERMEER 3,326,077
OPTICAL DEVICE EMPLOYING MULTIPLE SLIT
PATTERNS FOR ZERO REFERENCE
IN A SHAFT ENCODER
Filed Sept. 3, 1963 2 Sheets-Sheet 1

INVENTOR.
HARRY W. A. VANDERMEER
BY
Weingarten, Orenbuch & Pandiscio
ATTORNEYS

June 20, 1967

H. W. A. VANDERMEER 3,326,077

OPTICAL DEVICE EMPLOYING MULTIPLE SLIT PATTERNS FOR ZERO REFERENCE IN A SHAFT ENCODER

Filed Sept. 3, 1963

2 Sheets-Sheet 2

INVENTOR.

HARRY W. A. VANDERMEER

BY

Wenzgaten, Orenbach & Pandiscio

ATTORNEYS 3,326,077
Patented June 20, 1967

3,326,077

OPTICAL DEVICE EMPLOYING MULTIPLE SLIT PATTERNS FOR ZERO REFERENCE IN A SHAFT ENCODER

Harry W. A. Vandermeer, Chelmsford, Mass., assignor, by mesne assignments, to Dynamics Research Corporation, Stoneham, Mass.

Filed Sept. 3, 1963, Ser. No. 306,008
8 Claims. (Cl. 88—14)

This invention relates to position indicators and more particularly to an improvement in precision reference markers.

Although the present inveniton has application to a variety of instruments and systems, it is particularly applicable to shaft encoders. Accordingly, by way of example but not by limitation, the following specification is directed to a primary object of the invention—the provision of a precise zero position indicator for a shaft encoder.

As is well known to persons skilled in the art, a shaft encoder basically comprises a code disc mounted on a rotatable input shaft and provided with an array of code elements thereon, plus means for scanning the code elements to produce signals which are translated to provide an indication of the magnitude of movement of the input shaft. In an optical encoder the code elements are opaque and transparent areas in the code disc and scanning is accomplished by a light source-light detector system. The code elements also may be conductive or magnetic, in which case the scanning system embodies contact brushes or magnetic pickups.

From a functional standpoint encoders are of two types—direct reading and incremental. A direct reading encoder is designed to emit a different multi-bit binary signal output for each different incremental position of the input shaft, including its zero or reference position. An incremental encoder is designed to emit identical signals for successive incremental positions of its input shaft. The magnitude of the increments of shaft rotation represented by these identical signals is a matter of code disc size and design. In a typical incremental encoder an output signal is generated each time its input shaft rotates through five minutes of arc. These signals are fed to a forward-backward binary counter. By automatically resetting the counter to zero each time the 360° position is reached, the count at any particular instant is a measure of the angular position of the incremental encoder shaft at that instant.

While a direct reading encoder avoids the use of a binary counter, it requires a very expensive code disc and a more complicated light responsive signal generating unit. Moreover, a direct reading encoder usually must embody a Gray code in order to minimize output error. Since most computers are designed to operate on straight binary rather than Gray code, the use of a direct reading encoder generally involves a Gray-to-binary code converter between the encoder and the computer to which the encoder output is fed. As a consequence, there has been a decided trend away from direct reading encoders to incremental encoders. However, it has been recognized that to achieve with an incremental encoder results as reliable and accurate as can be obtained with a direct-reading encoder, resetting of the counter must not be determined by the count in the counter but by the actual position of the encoder shaft. In other words, the counter must be reset by an external signal generated by means operating in direct response to shaft position. However, providing independent means for generating a signal indicative of zero shaft position involves certain complications, the most important of which is the need for a signal amplitude and shape which permits resolution and accuracy at least comparable to that of the encoder output. In this connection it is to be noted that it is standard practice in the case of an optical incremental encoder to obtain a favorable signal-to-noise ratio and also sharp resolution by scanning a plurality of identical code elements at one time, either over a single substantial segment of the code disc or at a plurality of key points, e.g., every 90°. However, the same approach is not feasible for generating a zero position signal. If the zero position signal is generated by virtue of scanning a relatively large segment of the code disc, the zero signal will not have a sharp rise and fall but instead will rise and fall gradually, thereby making it difficult to determine exactly when the zero position is reached. On the other hand, if the code disc is scanned at $n$ spaced points, while the signal output will rise and fall sharply, it will do so $n$ times during one revolution of the disc. Therefore, some means must be provided for determining which of the output zero signals is actually representative of zero position.

Accordingly, a more specific object of the present invention is to provide a zero position indicator for encoders which provides at precisely zero position a signal of substantial amplitude having a sharp rise and fall so as to be readily distinguishable.

Other objects and many of the attendant advantages of the invention will be readily appreciated as the invention becomes better understood by reference to the following detailed description when considered in connection with the accompanying drawings wherein.

Figure 1:
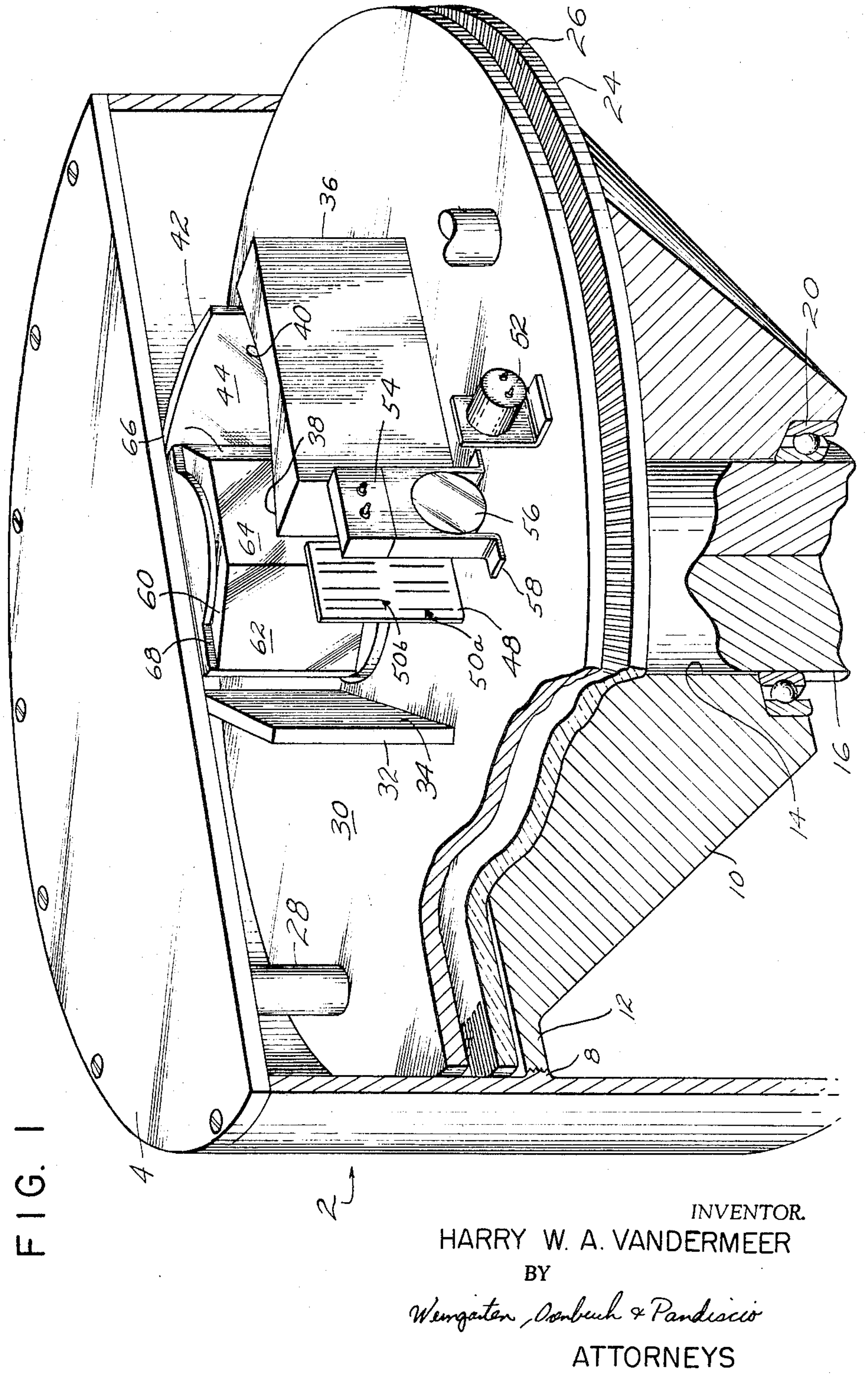
FIG. 1 is a perspective view of an encoder embodying a preferred form of the present invention.

The apparatus shown in the drawings comprises a cylindrical casing 2 having a removable top end wall 4, a corresponding bottom end wall (not shown), plus a threaded internal flange 8 to which is attached a bearing support 10. The latter has a peripheral flange 12 adapted to mount to the casing flange 8. The bearing support has a centrally located bore 14 to accommodate a rotatable encoder shaft 16 whose outer end (not shown) is adapted to be connected to a suitable drive means forming part of or operating in synchronism with the system with which the encoder is used. The shaft is rotatably supported by a pair of bearings 20 (only one of which is illustrated) mounted in bore 14. Mounted on shaft 16 above the top of bearing support 10 is a circular optical code disc 24. The latter is formed of optical glass and is provided on one surface with a circular code track identified generally at 26 comprising a series of alternately occurring opaque and transparent code elements which are disposed radially. The encoder also includes means (not shown) for directing a light beam through the code track at one or more selected points and means (also not shown) for detecting the quantity of light transmitted through said code track at said one or more points as said code wheel rotates. Such means are conventional and, since they are not essential to the present invention, are omitted from the drawings for the sake of facilitating a clear and concise presentation of the invention.

Supported by a plurality of posts 28 from the end wall 4 in substantially co-planar relation with code disc 24 is a support plate 30 which supports most of the component parts of the illustrated embodiment of the invention. Alternatively the plate 30 could be omitted and the component parts supported thereby could be attached directly to end wall 4. These component parts include a first mirror 32 having a single flat reflecting surface 34, a second mirror 36 having two flat reflecting surfaces 38 and 40 disposed at an angle to one another and a third mirror 42 having a spherical reflecting surface 44. These mirrors are affixed to plate 30 by suitable means (not shown) and are disposed in a predetermined angular arrangement described hereinafter. Also mounted on plate 30 by suitable means (not shown) is a thin slit plate 48 having two patterns of slits identified generally as 50*a* and 50*b* disposed one below the other. Operatively associated with slit plate 48 are a lamp 52, a photocell 54 and a condensing lens 56, all supported by plate 30. The photocell and the lens are supported by a generally U-shaped bracket 58. The lamp is located below the photocell directly behind the condensing lens system 56 which is disposed and designed to collimate the light emitted by the lamp into a slightly inwardly tapered beam which illuminates the bottom slit pattern 50*a*. The photocell is positioned directly behind the top slit pattern 50*b*. Although not fully shown, it is to be understood that the lamp 52 and the photocell 54 are connected via their terminals to appropriate input and output circuits. The light source operates continuously. The photocell may be any suitable kind of light responsive device capable of generating or controlling the generation of an electrical output varying in accordance with the light detected thereby.

In addition to the foregoing components which are supported by plate 30, the invention as illustrated includes a fourth mirror 60 having three flat reflecting surfaces 62, 64 and 66 disposed at an angle to one another. This fourth mirror 60 is mounted on the inner end of shaft 16. For this purpose the inner end of shaft 16 has a recess or slot 68 cut in its surface over an angular distance of about 180°. The rear side of the mirror is shaped to fit in the recess 68. The mirror 60 is at the same level of the other mirrors and rotates with shaft 16.

Figures 2, 3, 4, 5:
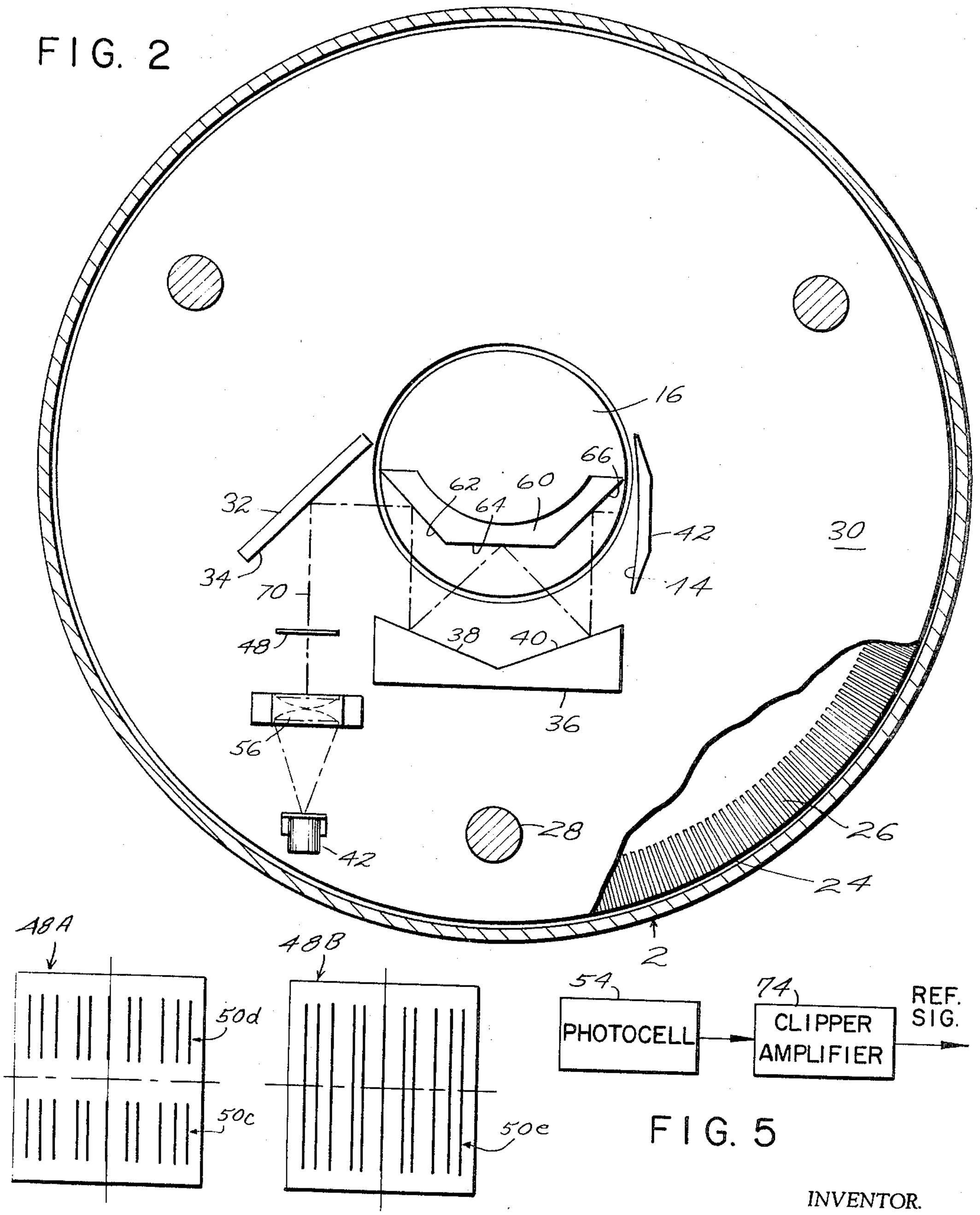
FIG. 2 is a plan sectional view of the same encoder showing the optical system of the present invention.
FIGS. 3 and 4 are elevational views of two alternate forms of slit plates useful with the present invention.
FIG. 5 is a block diagram of the output circuit of the illustrated embodiment of the invention.

The mirrors 32, 36 and 60 serve to transmit the projected image of the lower slit pattern to and away from the spherical mirror 42. More specifically, the various mirrors are designed and oriented so that when shaft 16 is positioned with reflecting surface 64 disposed parallel to the slit plate 48 as shown in FIG. 2, the center ray 70 of the beam directed at slit pattern 50*a*, i.e., the ray directed at the middle of the slit pattern, will impinge on reflecting surface 34 on or close to its center point and thereafter by successive reflections will impinge on reflecting surfaces 62, 38, 64, 40, 66, and 44 in the order named. The raystriking surface 44 will be reflected back by surfaces 66, 40, 64, 38, 62, and 34 in the order named but at the level of slit pattern 50*b*. In following this multiple reflection path, the center ray will impinge on reflecting surfaces 62, 64, 66 and 44 at their vertical center lines. As used herein, the term "vertical center line" denotes a center line which extends parallel to shaft 16, i.e., from top to bottom in FIG. 1.

To achieve the folded or multiple reflection path just described, the mirror 32 is set at a 45° angle to slit plate 48 and also to spherical mirror 42 which is disposed at a right angle to the slit plate. The mirror 60 is designed with its surfaces 62 and 66 arranged at angles of 135° to its center surface 64 whereby when surface 64 is positioned parallel to slit plate 48, surface 62 will be at a right angle to surface 34 and surface 66 will be parallel to surface 34 and at a 45° angle to the axis of spherical mirror 42. Additionally, mirrors 32 and 42 are positioned so that their vertical center lines will be aligned with the vertical center lines of surfaces 62 and 66 when surface 64 is positioned parallel to slit plate 48. Mirror 36 is positioned so that its surfaces 38 and 40 are symmetrically disposed on opposite sides of a center line for shaft 16 extending at a right angle to slit plate 48. The reflecting surfaces 38 and 40 are formed at an angle to 135° to each other and mirror 36 is oriented so that its surface 38 will be disposed at equal but opposite angles of 22½° to surfaces 62 and 64 when surface 64 is positioned parallel to slit plate 48. Under the same conditions, its surface 40 will be disposed at opposite angles of 22½° to surfaces 64 and 66.

As above described the mirrors 32, 36, and 60 serve to transmit the projected image of the lower slit pattern to and from the spherical mirror. The latter inverts the image so that it is reflected back at the level of the upper slit pattern 50*b*. As used herein, the term "invert" denotes image reversal in two dimensions. The length of the path followed by the center ray between the slit plate and spherical mirror 42 is equal to the radius of curvature of the spherical mirror so as to achieve proper focusing of the image on the upper slit pattern.

When the mirror 60 is positioned as shown in FIG. 2 with its surface 64 parallel to the slit plate, the reflected image will coincide with the upper slits and, therefore, a maximum amount of light from the projected image will impinge upon and be sensed by the photocell. This position of mirror 60 represents the zero position of shaft 16. If now the shaft is rotated, the accompanying movement of mirror 60 will cause the image to move across the slit plate in one direction or the other depending upon the direction of shaft rotation. This movement of the image will reduce the amount of light sensed by the photocell since a lesser number of the slit images of the first slit pattern will coincide with the slits of the second slit pattern. The maximum number of slit images which can be aligned with slits of the second slit pattern at positions other than complete coincidence depends upon the slit patterns. If the slit patterns consisted of equally spaced slits, the number of slit images passed by the second pattern would vary from 0 to $n$ by one-slit increments so that the maximum number of slit images that could be sensed by the photocell at positions other than complete coincidences would be $n-1$. However, by making the slit pattern irregular, it is possible to limit the maximum number of slit images of the first slit pattern transmitted by the second slit pattern at positions other than full coincidence, i.e., zero position, to a number substantially smaller than $n-1$. Consequently, while the photocell output will fluctuate as the reflected image sweeps across the upper slit pattern, it will remain below a certain threshold level until full coincidence occurs, at which point it will exceed the threshold level by a substantial amount in response to the large increases in light transmitted to it by the upper slit pattern. Thus, if each slit pattern were made to consist of six narrow slits with the distances between the center lines of successive slits corresponding to 7, 8, 10, 6 and 10 length units in that order with each length unit at least equal to slit width, at any one time the maximum number of slit images which could coincide with slits of the second slit pattern would be two, except when the mirror 60 is positioned to give full coincidence. With such a slit pattern, the number of slit images which will coincide as the reflected image sweeps across the slit plate will be 0, 1, 2 or 6, the latter occurring only at one position of mirror 60. Hence the light detected by the photcell at zero shaft position when full coincidence occurs will be at least three times as great as the light detected at any other position of the shift where only limited partial coincidence can occur. Therefore, the signal-to-noise ratio of the zero reference output pulse is substantial, permitting it to be processed unambiguously by state of the art electronic circuitry.

An important consideration of the slit pattern design is the image inversion effected by mirror 42. The latter effects inversion of the projected image so that the image of the slit on the right hand end of slit pattern 50*a* as seen in FIG. 1 comes back on the left hand end of slit pattern 50*b* when the shaft is positioned as shown in FIG. 2. Hence in order to obtain full coincidence of the reflected slit images with the slits of pattern 50*b*, one of two arrangements is required. In one arrangement (FIG.

1) the two slit patterns are identical in number and spacing but are inverted. With this arrangement the projected image of slit pattern **50*a* will be reflected back in full coincidence with slit pattern 50*b* when mirror 60 is positioned as shown in FIG. 2. In the other arrangement (FIG. 3), the slit plate 48A has two slit patterns 50*c* and 50*d* which are identical and at the same time, each slit pattern is symmetrical about its vertical center line so as to comprise two halves which are mirror images of each other. Each half comprises a series of slits spaced non-uniformly in a manner similar to the manner previously described so as to provide a good signal-to-noise ratio. Because of the slit pattern symmetry, notwithstanding the image inversion effected by mirror 42, the projected image of slit pattern 50*c* will be reflected back in full coincidence with slit pattern 50*d* when mirror 60** is positioned as shown in FIG. 2.

FIG. 4 illustrates still another variation of the slit plate. In this case the slit plate 48B comprises a single pattern of non-uniformly spaced slits **50*e* which is symmetrical about its vertical center line so as to comprise two halves which are mirror images of each other. This form of slit plate is sized so that when used in place of the slit plate 48 of FIG. 1, only the portion below its horizontal center line (shown in dashed line) is illuminated directly by the beam from light source 52**. The reflected image returns at the level of the top half of the slit plate.

Of course, the invention is not limited to any particular slit spacing specified hereinabove. Obviously, many other slit patterns can be devised which will limit the number of slits in coincidence to a small number except at one position where full coincidence exists.

It is also believed to be apparent that the total amount of projected light passed by the slit patterns at zero position must be well above the threshold level of the photocell. This quantity of light is determined by the width, length and number of the slits, each of which can be varied. In this connection it is to be appreciated that the width of the slits determines the resolving power of the zero reference unit which must provide a resolution at least as good as that of the encoder itself. Hence the slit width required for a given resolution depends upon the resolving power which is desired. Another feature of the designed configuration is that the individual slit width does not depend upon the radius of the encoder disc, which property can be exploited in order to increase the resolving power of the zero reference device. The available space is here the limiting factor.

By way of example, in order to get a resolving power of 8 seconds of arc, where the code disc has a radius in the order of 1.5 inches, without the sensitivity gain afforded by the present invention and a further small improvement in resolution attainable by proper design of the circuits that process the output of the photocell, the slit width would have to be in the order of 6 microns. However, with the present invention a resolving power of 8 seconds of arc can be achieved for the zero reference unit where the slits for the zero reference slit pattern have a width in the order of 25 microns. Nevertheless, in any event, the slit width is still limited and cannot be increased for transmission of more light without sacrifice of resolving power. Of course, the quantity of light that can be passed by the slit patterns can be increased by increasing the length of the slits. However, other considerations limit the length of the slits. Typically the slits will have a length in the order of 0.15 inch. Accordingly in a device of the type illustrated, the one parameter then can be modified easily to assure that a sufficient quantity of light strikes the photocell when zero position is reached, is the number of slits in the slit patterns. By way of illustration, in practice the number of slits will be in the order of 25–75 where the slit width is about 25 microns and the slit length about 0.15 inch. A slit pattern conforming to the foregoing requirements will provide a resolution of about 8 seconds of arc for a zero position indicator of the character herein described and illustrated.

As previously indicated the resolution of the illustrated zero reference system is further improved by proper design of the photocell output circuits. As shown in FIG. 5, in practice the photocell 54 has an output circuit comprising a clipper amplifier 74. The latter is adapted to yield a zero reference signal output only when the input from the photocell exceeds a predetermined threshold level. This threshold level is set to be above the maximum amplitude of the pulses generated by the photocell when less than all of the first slit images coincide with the second slit pattern. The pulses generated by the photocell are essentially triangular in shape. The pulses exceeding the predetermined threshold level are amplified to give a sharp output with a substantial signal-to-noise ratio that can be readily processed by state of the art electronic circuitry.

As previously indicated the system herein described is characterized by excellent sensitivity. In this regard it is to be noted that the multiple reflection path provides a sensitivity gain in the sense that when shaft 16 rotates, the reflected slit pattern image that is directed back to the slit plate will move across the slit plate at an angular speed which is twelve times greater than that of the shaft. In other words a 1° movement of shaft 16 will produce and be accompanied by a translational movement of the reflected image over an arc distance of 12°.

While the six flat mirror surfaces 34, 38, 40, 62, 64, and 66 function to fold up the light path, the three rotating mirrors 62, 64 and 66 also have the function of increasing the angle of rotation. It can be proven easily that the direction of a light ray reflected by a flat mirror which rotates oven an angle $\rho$ will change over an angle $2\rho$. The stationary mirrors 34, 38 and 40 do not produce any angular gain as a function of the angle $\rho$ over which the shaft 16 rotates. Since the optical light paths before and after reflection by spherical mirror surface 44 are exactly the same, each of the rotating mirrors 62, 64 and 66 will provide angular gains before and after reflection by mirror surface 44. Thus the total angular gain $\alpha$ is given by the expression $$\alpha=2kn\rho$$

where $\rho$ is the angular rotation of the rotating mirror 60 carried by shaft 16, $n$ is the number of rotating mirror surfaces struck by the center ray, and $k$ is the number of times the centered ray is reflected by each rotating mirror surface. Substituting the values 3 and 2 for $n$ and $k$ respectively, it can be determined that the total gain $\alpha$ is $12\rho$. Because of this large gain, each output pulse will exhibit discrimination but also provides excellent resolution of the zero reference position.

Although this description pertains to a single zero reference, it is also possible to generate multiple absolute reference markers by placing more than one rotating mirror on shaft 16. If one additional diametrically opposed rotating mirror is used, the system comprising mirrors 32, 38, 60 and 42 can be used for both rotating mirrors; alternatively a separate multiple mirror system can be provided for the second rotating mirror. By placing each mirror arrangement in a different plane along the axis of shaft 16, it is possible to provide a substantial number of separate reference marker systems. Of course, additional detectors and external circuitry must be included in order to distinguish one reference from another. However, because the multiple reference markers are likely to be separated from each other by large angles, the accuracy and resolution required of the additional circuitry is quite low.

While the present invention has been described in connection with an optical encoder it is believed to be apparent that it is capable of other uses. Considered broadly, it is applicable generally to the problem of making angular measurements with a high degree of precision using a device of relatively small size. More particularly it may be used to convert the angular displacement of a mechanical member to an accurate linear displacement of a predetermined image. Thus it may be used to translate the image of a pointer along a scale, as in the indicating meter or dial of a measuring instrument, like a tachometer, optical compass or theodolite. It also may be used as a clock pulse generator where timing signals are required to be generated in precise synchronism with a moving mechanical member. In these and other cases obvious to persons skilled in the art, the invention has many advantages. It is precise, accurate, has excellent sensitivity, can be constructed in small sizes suitable for airborne apparatus, it has a simplicity of construction that provides ruggedness and reliability, makes use of state of the art electronics without need for exotic unproven electronic components, is substantially insensitive to temperature variations within reasonable limits, and is capable of many different applications without any substantial variance in accuracy.

Obviously, many other modifications and variations of the present invention are possible in view of the above teachings.

Thus, for example, it is not necessary to have the mirror 32. Instead it may be eliminated and the light source-photocell-condensing lens-and slit plate assembly shifted clockwise ninety degrees (FIG. 2) with the slit plate in line with mirror surfaces 62, 66 and 44. In its new position the slit plate would be at right angles to its illustrated position so that the center ray would be straight between the light source and mirror surface 62. Of course, in such a case the total distance from the slit plate to the concave mirror would be the same in order to achieve good focusing, unless a different concave mirror is used in place of mirror 42. It is to be understood, therefore, that the invention is not limited in its application to the details of construction and arrangement of parts specifically described or illustrated, and that within the scope of the appended claims, it may be practiced otherwise than as specifically described or illustrated.

What is claimed is:

1. In an encoder having a shaft and a code disc mounted on said shaft for rotation therewith with respect to a fixed member, apparatus for indicating when said shaft and disc are in a predetermined angular position with respect to said fixed member comprising means for generating a slightly convergent light beam, means defining a first slit pattern in the path of said light beam whereby a projected image of said first slit pattern is formed when said first slit pattern is illuminated by said beam, said means for generating a light beam and said means defining a first slit pattern remaining in a stationary position with respect to said fixed member, a plurality of reflecting surfaces for transmitting said images in one direction, a concave spherical reflector stationary with respect to said fixed member and positioned to receive said image transmitted in said one direction and to invert and reflect said image in the opposite direction back to said reflecting surfaces, means defining a second slit pattern conforming to said inverted image, said second slit pattern being stationary with respect to said fixed member and positioned to receive and transmit said image when said reflecting surfaces and said reflector are disposed in a predetermined angular arrangement, and light responsive means for generating an electrical output varying in accordance with the quantity of light transmitted by said second slit pattern, at least one of said reflecting surfaces disposed for rotation with said shaft whereby as said one reflecting surface rotates said image will sweep across said second slit pattern and will coincide fully with said second pattern when said one reflecting surface is disposed in accordance with said predetermined angular arrangement.

2. The invention defined by claim 1 wherein said slit patterns comprise non-uniformly spaced slits.

3. The invention defined by claim 1 wherein the length of the path of the center ray of said light beam from said first slit pattern to said second slit pattern when said image is transmitted fully by said second slit pattern is equal to twice the radius of curvature of said spherical reflector.

4. The invention defined by claim 1 wherein three of said reflecting surfaces are disposed for rotation with said shaft.

5. The invention defined by claim 1 wherein said slit patterns are disposed one above the other.

6. The invention defined by claim 1 wherein said slit patterns are co-planar.

7. Apparatus for determining when a rotatable member is in a predetermined angular position with respect to a mechanical reference point comprising, first, second and third reflecting surfaces disposed for rotation in synchronism with said member; said second surface located between said first and third surfaces with said second surface disposed at a 135° angle to said first surface and said third surface disposed at a 135° angle to said second surface; fourth, fifth and sixth reflecting surfaces and first and second slit patterns, said fourth, fifth and sixth reflecting surfaces and said first and second slit patterns being fixed with respect to said mechanical reference point, said fourth surface disposed at a 45° angle to said first slit pattern and said fifth surface disposed at a 135° angle to said sixth surface; a spherical reflector disposed with its axis at a 45° angle to said fourth surface and fixed with respect to said mechanical reference point, said first, second and third surfaces located between said fourth surface and said spherical reflector, means for projecting a light beam at said first slit pattern whereby said first pattern is projected onto said fourth surface; said first, second and third surfaces disposed so that when said rotatable member is in said predetermined angular position said projected first pattern will (1) be reflected in turn by said fourth, first, fifth, second, sixth, and third surfaces to said spherical reflector, (2) be inverted and reflected by said spherical reflector back to said second slit pattern via said third, sixth, second, fifth, first and fourth surfaces, said reflected first pattern coinciding and being transmitted fully by said second slit pattern only when said member is in said predetermined position and sweeping across said second pattern as said member passes through an angle which includes said predetermined angular position, light-responsive means for producing an output signal varying in amplitude according to the amount of light transmitted by said second slit pattern, and means for generating a signal indicative of said predetermined position when said output signal exceeds a predetermined threshold level.

8. Apparatus as defined by claim 7 wherein said slit patterns are identical, each comprising a plurality of non-uniformly spaced slits.

References Cited

Garbuny, M.; Hansen, J. R.; Vogl, T. P.: "Method for the Generation of Very Fast Light Pulses," Review of Scientific Instruments, vol. 28, No. 10, October 1957, pp. 826–827.

JEWELL H. PEDERSEN, *Primary Examiner.*

A. A. KASHINSKI, *Assistant Examiner.*